US010294381B2

(12) United States Patent
Chaffins et al.

(10) Patent No.: US 10,294,381 B2
(45) Date of Patent: *May 21, 2019

(54) PIGMENT-BASED INKJET INKS

(71) Applicant: Hewlett-Packard Development Company, L.P., Fort Collins, CO (US)

(72) Inventors: Sterling Chaffins, Corvallis, OR (US); Kevin P. DeKam, Corvallis, OR (US); Jayprakash C. Bhatt, Corvallis, OR (US); Larrie Deardurff, Corvallis, OR (US); Cory J. Ruud, Corvallis, OR (US); Matthew Thornberry, Corvallis, OR (US)

(73) Assignee: Hewlett-Packard Development Company, L.P., Spring, TX (US)

(*) Notice: Subject to any disclaimer, the term of this patent is extended or adjusted under 35 U.S.C. 154(b) by 159 days.

This patent is subject to a terminal disclaimer.

(21) Appl. No.: 15/308,708

(22) PCT Filed: Jun. 4, 2014

(86) PCT No.: PCT/US2014/040851
§ 371 (c)(1),
(2) Date: Nov. 3, 2016

(87) PCT Pub. No.: WO2015/187148
PCT Pub. Date: Dec. 10, 2015

(65) Prior Publication Data
US 2017/0183522 A1 Jun. 29, 2017

(51) Int. Cl.
*B41J 2/01* (2006.01)
*C09D 11/38* (2014.01)
*C09D 11/322* (2014.01)

(52) U.S. Cl.
CPC .............. *C09D 11/322* (2013.01); *B41J 2/01* (2013.01); *C09D 11/38* (2013.01)

(58) Field of Classification Search
CPC ........ C09D 11/322; C09D 11/40; C09D 11/38
See application file for complete search history.

(56) References Cited

U.S. PATENT DOCUMENTS

| | | |
|---|---|---|
| 5,580,372 A | 12/1996 | Gino et al. |
| 5,643,357 A | 7/1997 | Breton et al. |
| 5,688,626 A | 11/1997 | Patel et al. |
| 5,811,213 A | 9/1998 | Chiba |
| 5,837,044 A | 11/1998 | Santilli et al. |
| 6,667,140 B2 | 12/2003 | Tosaka et al. |
| 6,730,155 B2 | 5/2004 | Gotoh et al. |
| 7,250,078 B2 | 7/2007 | Iijima et al. |
| 7,288,351 B2 | 10/2007 | Yaguchi et al. |
| 7,390,901 B2* | 6/2008 | Yang ................ C09B 1/262 546/33 |
| 7,429,293 B2 | 9/2008 | Cai |
| 7,806,971 B2 | 10/2010 | Saito et al. |
| 7,922,316 B2 | 4/2011 | Bannai et al. |
| 7,922,800 B2 | 4/2011 | Bauer et al. |
| 8,137,721 B2 | 3/2012 | Wen et al. |
| 8,465,894 B2 | 6/2013 | Yamanaka et al. |
| 8,500,897 B2 | 8/2013 | Tateishi |
| 8,710,116 B2 | 4/2014 | Valentini et al. |
| 9,187,661 B2 | 11/2015 | Prasad |
| 9,340,694 B2* | 5/2016 | Oura ............... C09D 11/38 |
| 10,040,959 B2 | 8/2018 | Deardurff et al. |
| 10,047,233 B2 | 8/2018 | Deardurff et al. |
| 2002/0009547 A1* | 1/2002 | Ito ............... B41M 7/0027 427/337 |
| 2004/0252169 A1 | 12/2004 | Chen et al. |
| 2005/0008960 A1 | 1/2005 | Yaguchi et al. |
| 2005/0039634 A1 | 2/2005 | Hermansky |
| 2005/0182154 A1 | 8/2005 | Berge et al. |
| 2006/0046178 A1 | 3/2006 | Akiyama et al. |
| 2006/0258775 A1 | 11/2006 | Lee |
| 2009/0169761 A1 | 7/2009 | Szajewski et al. |
| 2010/0285287 A1 | 11/2010 | Matsuyama et al. |
| 2010/0302326 A1* | 12/2010 | Morohoshi ............ B41J 2/1433 347/86 |
| 2011/0030580 A1 | 2/2011 | Jackson et al. |
| 2012/0050383 A1 | 3/2012 | Takayama et al. |
| 2012/0183894 A1 | 7/2012 | Matsumoto et al. |
| 2013/0063518 A1 | 3/2013 | Takebayashi et al. |
| 2013/0065998 A1* | 3/2013 | Lai ............... B01D 19/0409 524/265 |
| 2013/0079442 A1 | 3/2013 | Ma et al. |
| 2013/0307914 A1 | 11/2013 | Chen et al. |
| 2013/0327247 A1* | 12/2013 | Khavari ............ C09D 11/328 106/31.43 |

(Continued)

FOREIGN PATENT DOCUMENTS

EP 1321495 6/2003
EP 1333070 8/2003

(Continued)

OTHER PUBLICATIONS

International Search Report dated Feb. 26, 2015 for PCT/US2014/040851, Applicant Hewlett-Packard Development Company, L.P.

*Primary Examiner* — John Zimmermann
(74) *Attorney, Agent, or Firm* — Thorpe North & Western LLP

(57) ABSTRACT

The present disclosure is drawn to a pigment-based inkjet ink and methods. The inkjet ink includes water; from 2 wt % to 9 wt % pigment solids; from 0.05 wt % to 2 wt % of an acetylenic diol non-ionic surfactant; from 0.05 wt % to 2 wt % of a second surfactant. The second surfactant can be a polysorbate having at least 50% lipophilic oleic acid groups and having an HLB value of less than 15, or a $C_{12}$-$C_{18}$ polyoxyethylene glycol ether having an ethylene oxide number less than 20, or a perfluoropolyether including a polyethylene glycol primary alcohol or diol. The inkjet ink also includes from 5 wt % to 50 wt % of an organic solvent system comprising triethylene glycol and a cyclic amide.

15 Claims, No Drawings

(56) References Cited

U.S. PATENT DOCUMENTS

| | | |
|---|---|---|
| 2014/0247312 A1 | 9/2014 | Prasad |
| 2017/0022383 A1 | 1/2017 | Prasad et al. |
| 2017/0066940 A1 | 3/2017 | Deardurff et al. |
| 2017/0183522 A1 | 6/2017 | Chaffins et al. |
| 2017/0183523 A1 | 6/2017 | Deardurff et al. |
| 2018/0194958 A1 | 7/2018 | Bhatt et al. |
| 2018/0298213 A1 | 10/2018 | Bhatt et al. |

FOREIGN PATENT DOCUMENTS

| | | |
|---|---|---|
| EP | 2025726 | 2/2009 |
| EP | 2568017 | 3/2013 |
| EP | 2671928 | 12/2013 |
| JP | S56103262 | 8/1981 |
| JP | 2003140396 | 5/2003 |
| JP | 2006057044 | 3/2006 |
| JP | 2007140076 | 6/2007 |
| JP | 2013088482 | 5/2013 |
| WO | 2008048869 | 4/2008 |
| WO | 2013015813 | 1/2013 |
| WO | 2013052036 | 4/2013 |
| WO | 2015105503 | 7/2015 |

\* cited by examiner

PIGMENT-BASED INKJET INKS

BACKGROUND

There are several reasons that inkjet printing has become a popular way of recording images on various media surfaces, particularly paper. Some of these reasons include low printer noise, capability of high-speed recording, and multi-color recording. Additionally, these advantages can be obtained at a relatively low price to consumers. Though there has been great improvement in inkjet printing, accompanying this improvement are increased demands by consumers, e.g., higher speeds, higher resolution, full color image formation, increased stability, large format printing, etc.

A few characteristics of inkjet printing systems that are desirable to achieve relate to nozzle health, short term and sustained decap performance, kogation, color gamut, durability, ink efficiency, to name a few. Accordingly, investigations continue into developing ink formulations that can be printed accurately and with acceptable durability without excessive clogging.

DETAILED DESCRIPTION

The present disclosure is drawn to pigment-based inkjet inks with certain co-solvents or classes of co-solvents, and a blend of two surfactants that, in combination, can be formulated to provide inks suitable for high speed printing with improved decap performance (such as, for example, would be desirable in wide or large format printers that utilize a page wide printhead bar assembly). In further detail, the pigment-based inkjet inks can include water, from 2 wt % to 9 wt % pigment solids, from 0.05 wt % to 2 wt % of an acetylenic diol non-ionic surfactant, from 0.05 wt % to 2 wt % of a second surfactant, and from 5 wt % to 50 wt % of an organic solvent system comprising triethylene glycol and a cyclic amide. The second surfactant can be one of the following: a polysorbate having at least 50 wt % lipophilic oleic acid groups and having an HLB value of less than 15; or a $C_{12}$-$C_{18}$ polyoxyethylene glycol ether having an ethylene oxide number less than 20; or a perfluoropolyether including a polyethylene glycol primary alcohol or diol. In a related example, a method of inkjet printing can include jetting the inkjet ink described above onto a media substrate.

In another example, a method of making a pigment-based inkjet ink can include preparing a liquid vehicle including water, organic solvent, surfactant, and a polymeric binder; and slowly adding pigment particles to disperse and suspend the pigment particles within the liquid vehicle. In this manner, substantially all of the pigments are dispersed effectively the liquid vehicle, e.g., >99 wt %. The pigment-based inkjet ink after preparation can comprise water; from 2 wt % to 9 wt % pigment solids; from 0.05 wt % to 2 wt % of an acetylenic diol non-ionic surfactant; from 0.05 wt % to 2 wt % of a second surfactant, said second surfactant being a polysorbate having an HLB value of less than 15, or a $C_{12}$-$C_{18}$ polyoxyethylene glycol ether having an ethylene oxide number less than 20, or a perfluoropolyether including a polyethylene glycol primary alcohol or diol; from 5 wt % to 50 wt % of an organic solvent system comprising triethylene glycol and a cyclic amide; and 0.1 wt % to 3 wt % polymeric binder.

Though the inkjet ink in each of these embodiments can be fired from a variety of different types of inkjet architecture, it is noteworthy to point out that these inks can be fired very rapidly with improved decap performance, and thus are suitable for printing from printhead bars such as a page wide printhead assembly or other print bars. Since these types of printheads are typically designed to have a width that is at or about the width of the print media being printed to, no side to side carriage motion occurs. Instead, the media sheet or roll moves beneath the laterally stationary page wide printhead assembly or bar. Thus, inkjet inks that can be printed rapidly with high print quality and long decap performance can be highly advantageous for fast printing processes. That being stated, there is no requirement that the inkjet inks of the present disclosure be printed from this specific type of printhead assembly. These inkjet inks are, however, suitable for use in page wide printhead assemblies that may not be serviced or spit from unused nozzles as frequently as carriage type printhead assemblies.

In further detail, the inkjet inks of the present disclosure can provide many benefits over many other commercially available inkjet inks. These improvements are not to be considered limitations, but rather, are described to show advancement in the inkjet arts. For example, the formulations described herein can provide excellent first drop decap performance (short term decap) within the range of 0-8 seconds or even longer. Additionally, the inkjet inks of the present disclosure exhibit improved sustained decap, which is a desirable metric particularly for page wide printing from a page wide printhead bar assembly, and even more so for large format page wide printing, e.g., large format being defined as 24 inches wide or larger. This is because sustained decap performance for a system which uses a stationary print bar can improve print quality. For example, in systems where the media moves under a stationary print bar on a continuous roll for a relatively long period of time before it stops and is capped at a nozzle capping/spitting station, improved decap can not only provide for longer printing runs, but can reduce the need to spit excess ink on the print media to keep nozzle clear. With a print bar of this type, there is no opportunity to service a nozzle in the capping/spitting area while printing, and thus the nozzle during printing is serviced by spitting on the print job page itself. Thus, minimal servicing during printing would be beneficial to the print quality. That being said, this principle is not only useful for wide format printing. Printer bars can be used in other page wide formats, such as a 2 inch wide receipt printer at an outdoor gas pump or at credit card receipt printer, for example.

To illustrate, traditional decap performance typically relates to a nozzle that may become non-jettable for a short period of time during carriage scan printing processes. Thus, even during the print job itself, there is opportunity to recover misfiring or clogged nozzles when the printhead comes over a capping/spitting area (not over the print media). For page wide printing, during (short or long) print jobs, nozzles do not go over the capping/spitting area during the job, and thus, nozzle non-jettability is ameliorated primarily when jetting (or spitting) occurs over the paper during the print job. Frequent spitting onto the print media (print job) to clear nozzles would be considered objectionable, and thus, solving decap problems with frequent spitting is not a good option. Hence, to maintain a low frequency of spitting on paper, good sustained decap performance is beneficial when printing from a laterally stationary print bar. In accordance with this, the inkjet ink formulations described herein can provide excellent sustained decap performance (spitting frequency of 10 s for 10 min or more) to enable high speed and high quality printing.

The speeds that can be printed from page wide and other printers can be very fast. Certain high speed scanning printers with inks such as those described herein can be printed at ranges from 20 inches per second (ips) to 60 ips. Other page wide printers can be adapted to print at ranges such as 2 ips to 15 ips, 2 ips to 20 ips, or 2 ips to 30 ips. Thus, a range of speeds suitable for the present inks can be from 2 ips to 60 ips.

With this background in mind, in accordance with the examples described herein, various details are provided herein which are applicable to the inkjet ink, method of printing, method of making, etc., of the present disclosure.

In accordance with embodiments of the present disclosure, the liquid vehicle includes certain surfactants in combination, as well as certain organic co-solvents in combination, as will be described in greater detail hereinafter. Other ingredients that can be present include water, other co-solvents, other surfactants, biocides, sequestering agents, plasticizers, binders, etc.

In further detail with respect to the surfactant, there are two (or more) different surfactants present in the inkjet ink formulations of the present disclosure. The first surfactant that is present is an acetylenic diol non-ionic surfactant, typically present at from 0.05 wt % to 2 wt % based on the ink as a whole. An example of an acetylenic diol non-ionic surfactant is Surfynol® 104 (2,4,7,9-tetramethyl-5-decyne-4,7-diol). The second surfactant can be one of three types of surfactants, namely a polysorbate having at least 50% lipophilic oleic acid groups and having an HLB value of less than 15; or a $C_{12}$-$C_{18}$ polyoxyethylene glycol ether having an ethylene oxide number less than 20; or a perfluoropolyether including a polyethylene glycol primary alcohol or diol.

Polysorbate surfactants, generally, include Polysorbate 20 (or polyoxyethylene 20 sorbitan monolaurate), Polysorbate 40 (or polyoxyethylene 20 sorbitan monopalmitate), Polysorbate 60 (or polyoxyethylene 20 sorbitan monostearate), Polysorbate 80 (or polyoxyethylene 20 sorbitan monooleate), or the like. However, not all of these polysorbates have at least 50 wt % lipophilic oleic acid groups and having an HLB value of less than 15. Brand names for these polysorbate surfactants include those sold under the tradename Tween® or Alkest®. Regarding the nomenclature of these polysorbates, the number "20" following "polyoxyethylene" refers to the total number of oxyethylene —($CH_2CH_2O$)— groups found in the molecule. The number 20, 40, 60, or 80 following "polysorbate" is related to the type of fatty acid associated with the polyoxyethylene sorbitan portion. Monolaurate is indicated by 20, monopalmitate is indicated by 40, monostearate by 60 and monooleate by 80. Polysorbate 20, Polysorbate 60, and Polysorbate 80 are shown by example below, as follows:

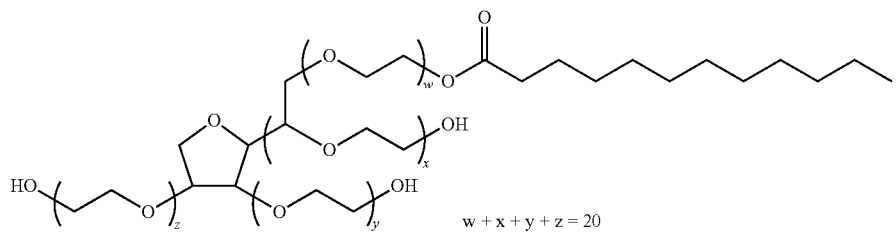

w + x + y + z = 20

Polysorbate 20

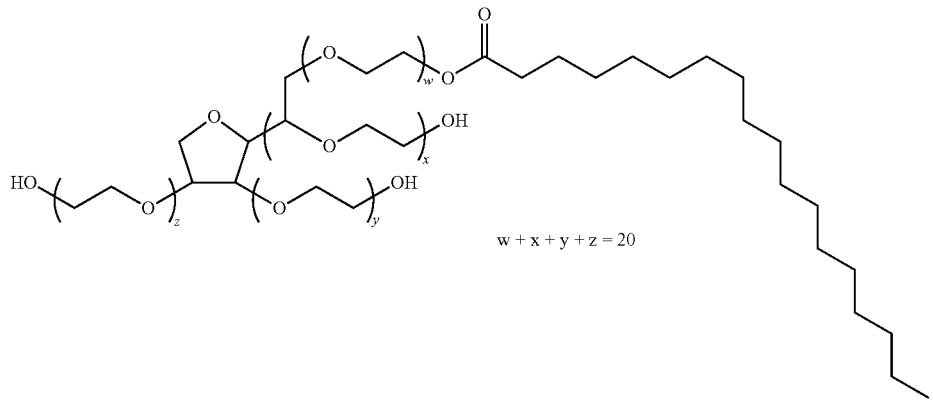

w + x + y + z = 20

Polysorbate 60

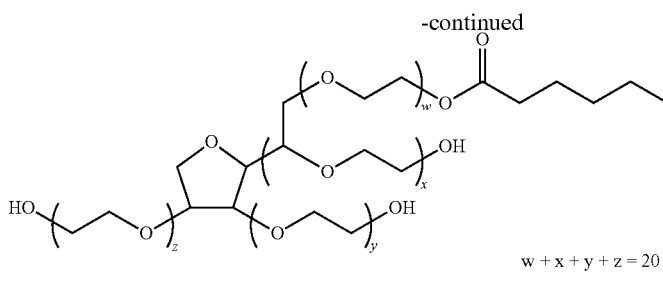

Polysorbate 80

Other polysorbates can likewise be used, including Polysorbate 85, or Tween® 85, which is polyethylene glycol sorbitan trioleate; or Polysorbate 81, or Tween® 81, which is a polyoxyethylene (5) sorbitan monooleate. Tween® 85 and Tween® 81 are oleyl type compounds and include 70 wt % oleic acid. Polyoxyethylene sorbitan dioleate can also be used.

The second surfactant can alternative be a polyoxyethylene glycol ether, including those having the base structure, as follows:

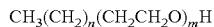

where m can be less than 20, and n can be from about 8 to 20 (note that there are Brij® surfactants and other polyoxyethylene glycol ether surfactants that fall outside of these ranges, but those within the ranges of m=less than 20 and n=8-20 are listed as being particularly beneficial in the inkjet inks of the present disclosure). In one particular example, the polyoxyethylene glycol ether can have a tolerance of up to 1 "cis" unsaturated (oleyl) group, e.g., 0 or 1 "cis" group (which would reduce the total number of hydrogen atoms by 2 at the double bond along the alkyl chain portion of the formula). Thus, oleyl type surfactants are included in this definition, even though they do not strictly fit within the above structural formulation, as the formulation is provided merely for convenience. Examples surfactants, their type, and their relative n and m values are provided in Table 1, as follows:

TABLE 1

| Surfactant Trade Name | Type | n | m |
| --- | --- | --- | --- |
| Brij ® S10 | Stearyl | 18 | 10 |
| Brij ® S5 | Stearyl | 18 | 5 |
| Brij ® S15 | Stearyl | 18 | 15 |
| Brij ® S20 | Stearyl | 18 | 20 |
| Brij ® S2/93 | Stearyl | 18 | 2 |
| Brij ® S7 | Stearyl | 18 | 7 |
| Brij ® 98/O20 | Oleyl | 18 | 20 |
| Brij ® O10 | Oleyl | 18 | 10 |
| Brij ® O2 | Oleyl | 18 | 2 |
| Brij ® O3 | Oleyl | 18 | 3 |
| Brij ® O5 | Oleyl | 18 | 5 |
| Brij ® C2 | Cetyl | 16 | 2 |
| Brij ® C7 | Cetyl | 16 | 7 |
| Brij ® C10 | Cetyl | 16 | 10 |
| Brij ® C20 | Cetyl | 16 | 20 |
| Brij ® L4/30 | Lauryl | 12 | 4 |
| Brij ® L9 | Lauryl | 12 | 9 |
| Brij ® L15 | Lauryl | 12 | 15 |

TABLE 1-continued

| Surfactant Trade Name | Type | n | m |
| --- | --- | --- | --- |
| Synperonic ® 91-2.5 | Decyl | 10 | 2 |
| Synperonic ® 91-10 | Decyl | 10 | 10 |
| Synperonic ® 13-12 | Tridecyl | 13 | 12 |

In yet another alternative example, the second surfactant can be a perfluoropolyether with a primary alcohol or diol. Examples include Fluorolink® D (HOCH$_2$CF$_2$O (CF$_2$CF$_2$O)$_p$(CF$_2$O)$_q$CF$_2$CH$_2$OH); Fluorolink® E (HO (CH$_2$CH$_2$O)$_n$CH$_2$CF$_2$O(CF$_2$CF$_2$O)$_p$(CF$_2$O)$_q$CF$_2$CH$_2$ (OCH$_2$CH$_2$)$_n$OH); Fluorolink® C10 (HOOCCF$_2$O (CF$_2$CF$_2$O)$_p$(CF$_2$O)$_q$CF$_2$COOH); or Fluorolink® T (HOCH$_2$CH(OH)CH$_2$OCH$_2$CF$_2$O(CF$_2$CF$_2$O)$_p$ (CF$_2$O)$_q$CF$_2$CH$_2$OCH$_2$CH(OH) CH$_2$OH), for example. In these examples, p+q can be 20 to 200, or from 40 to 180. Also, p/q can be 0.25 to 5, or can be from 0.5 to 2. n can be from 1 to 6, or from 1 to 4, or from 1 to 2.

In the inkjet inks described herein, suitable co-solvents for use include water and water soluble organic co-solvents. Any of a number of solvents can be used, but in accordance with examples of the present disclosure, certain organic co-solvents are used to provide some of the benefits described herein. Triethylene glycol is one such solvent. Triethylene glycol provides the benefit of acting as a humectants providing improved short term decap performance. Additionally, the presence of a cyclic amide can provide certain benefits, including short term and sustained decap, and these solvents can work well with the surfactants described herein. In one example, there can be two cyclic amides present. For example, a combination of 2-pyrrolidinone and Dantocol [di(2-hydroxyethyl)-5,5-dimethylhydantoin] can be particularly effective together. Benefits provided by this combination of cyclic amides include assistance with nozzle health and trajectory at certain concentrations and ratios. It is noted that in one example, the presence of triethylene glycol, Dantocol, and 2-pyrrolidinone strongly interact with one another, so formulations that utilize all three tend to perform better with respect to short term decap, sustained decap, and trajectory than systems without all three solvents.

Examples of water soluble organic co-solvents that may additionally be used include, but are not limited to, aliphatic alcohols, aromatic alcohols, diols, triols, glycol ethers, poly (glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, co-solvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides. Specific examples of certain co-solvents that may likewise be used include, but are not limited to, 1,5-pentanediol, Liponic ethoxylated glycerol 1 (EG-1), Liponic ethoxylated glycerol 7 (EG-7), 2-methyl-2,4-pentanediol, 2-methyl-1,3-propanediol, 2-ethyl-2-hydroxymethyl-1,3-propanediol, diethylene glycol, 3-methoxybutanol, propylene glycol monobutyl ether, 1,3-dimethyl-2-imidazolidinone, and derivatives thereof. Co-solvents can be added to reduce the rate of evaporation of water in the inkjet ink to minimize clogging or provide other improved properties related to viscosity, pH, surface tension, optical density, gamut, durability, decap, and print quality, for example. The water soluble organic co-solvent system total concentration can range from about 5 wt % to about 50 wt %, or from 10 wt % to 40 wt %. Each organic co-solvent alone can be typically present at from about 0.1 wt % to about 20 wt % of the inkjet ink composition. This being said, the solvents may be present in the inkjet ink composition at any concentration that is effective for use.

In another aspect of the present disclosure, various biocides can be used to inhibit growth of undesirable microorganisms. Several non-limiting examples of suitable biocides include benzoate salts, sorbate salts, and commercial products such as Nuosept®, Ucarcide®, Vancide®, Proxel GXL, Anticide® B20 or M20, Kordex® MLX for example. Typically, such biocides comprise less than about 5 wt % of the inkjet ink composition and often from about 0.05 wt % to about 2 wt %.

Other known additives can also be included, as known in the art.

The ink vehicle or liquid vehicle described herein can provide pigment-based inkjet inks with improved decap performance. For example, many similar inkjet inks that have been commercially available deliver short term decap performance of only 0-2 seconds, or there are others which deliver short term decap performance for longer periods, but that is typically a $2^{nd}$ drop short term decap. In accordance with the present disclosure, inkjet inks can be prepared with a short term $1^{st}$ drop decap of 0-8 seconds, which is very good short term decap performance as recognized in the thermal inkjet arts. Likewise, sustained decap performance with many commercially available inkjet inks is also relatively poor, even at typical spitting frequencies of 5 seconds for 10 minutes. The inkjet inks of the present disclosure can be formulated to have sustained decap performance exceeding this, e.g., 5 second for 10 minutes or 10 seconds for 10 minutes.

In order to improve durability further, a binder can be included in the inkjet inks of the present disclosure as well. Though the addition of a binder can improve durability, too much binder can significantly impact decap performance negatively. Thus, a balance between decap performance and durability can be considered when adding binder to the formulations of the present disclosure.

An exemplary binder that can be included in the inkjet ink is a Hydran™ RW-7500 or Hydran™ RW-7581 from DIC, which are polyurethane binders obtained by reacting a polyol containing a vinyl polymer having two hydroxyl groups at one end and at least one polyol. Other suitable binders that can be used include other water-dispersible or water soluble polymers. Examples of polymer classes include acrylics, styrenics, polyethylenes, polypropylenes, polyesters, polyamides, (other) polyurethanes, polyureas, polyethers, polycarbonates, polyacid anhydrides, and copolymers and/or combinations thereof. Such polymer particles can be iono-meric, film-forming, non-film-forming, fusible, or heavily crosslinked, and can have a wide range of molecular weights and glass transition temperatures.

Examples of useful polymeric binders include styrene-acrylic copolymers sold under the trade names Joncryl® (S.C. Johnson Co.), Ucar™ (Dow Chemical Co.), Jonrez® (MeadWestvaco Corp.), and Vancryl® (Air Products and Chemicals, Inc.); sulfonated polyesters sold under the trade name Eastman AQ® (Eastman Chemical Co.); polyethylene or polypropylene resin emulsions and polyurethanes (such as the Witcobonds® from Witco); polyacrylic type polymers such as polyacrylic acid and styrene-acrylic methacrylic acid copolymers (such as as Joncryl® 70 from S.C. Johnson Co., TruDot™ IJ-4655 from MeadWestvaco Corp., and Vancryl® 68S from Air Products and Chemicals, Inc. These polymers can be used because they are compatible in typical aqueous-based inkjet ink compositions, and because they render printed images that are highly durable towards physical abrasion. Binders are normally included in the inkjet inks of the present disclosure at from 0.1 wt % to 3 wt %, but more typically from 0.5 wt % to 2 wt %, based on the polymer solids content.

The pigments that can be used in accordance with embodiments of the present disclosure include both self-dispersed pigments as well as conventionally dispersed pigments, e.g., pigments dispersed by a separate dispersing agent that is not covalently attached to the surface. If self-dispersed, a dispersant is typically prepared in a precursor form, and then the precursor is attached to the pigment to chemically modify the surface of the pigment. In one example, the dispersant can be attached to the pigment using various precursor materials, such as para-aminobenzoic acids, isophthalic acids, tricarboxylic acids, carboxylic groups, sulfonylic groups, phosphates, oligomers, polymers, and isomers thereof, for example. Other precursors can also be used to attach to the pigment, as would be known by those skilled in the art.

The formulations of the present disclosure can be effective for use with both black and colored pigments. Specifically, if black is used, the black pigment can be any commercially available black pigment that provides acceptable optical density and print characteristics. Such black pigments can be manufactured by a variety of known methods such as channel methods, contact methods, furnace methods, acetylene methods, or thermal methods, and are commercially available from such vendors as Cabot Corporation, Columbian Chemicals Company, Evonik, Mitsubishi, and E.I. DuPont de Nemours and Company. For example, commercially available carbon black pigments include Color Black FW 200, Color Black FW 2V, Color Black FW1, Color Black FW 18, Color Black FW S160, Color Black FW S170, Printex® including 95, 85, 75, 55, 45, 300, 35, 25, 200, 12, and Special Blacks including, 4A, 4, 5, 6, 550, 350, 250; BP1100, BP900, BP800, M1100, M900, M800, Monarch® 1400, Monarch® 1300, Monarch® 1100, Monarch® 1000, Monarch® 900, Monarch® 880, and Monarch® 700; Cab-O-Jet® 200 and Cab-O-Jet® 300; Raven® 2500 Ultra, Raven® 2000, Raven® 7000, Raven® 5750, Raven® 5250, Raven® 5000, and Raven® 3500; 45 B, and combinations thereof.

If colored pigments are used, any of a number of pigments can be selected for inclusion in the inkjet inks of the present disclosure, such as cyan, magenta, yellow, blue, orange, green, pink, etc. Suitable organic pigments include, for example, azo pigments including diazo pigments and monoazo pigments, polycyclic pigments (e.g., phthalocyanine pigments such as phthalocyanine blues and phthalocyanine greens, perylene pigments, perynone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitropigments, nitroso pigments, anthanthrone pigments such as Pigment Red 168, and the like. Representative examples of phthalocyanine blues and greens include copper phthalocyanine blue, copper phthalocyanine green and derivatives thereof (Pigment Blue 15 and Pigment Green 36). Representative examples of quinacridones include Pigment Orange 48, Pigment Orange 49, Pigment Red 282, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Pigment 150 is another example of an azo pigment. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in powder, press cake, or dispersion form from a number of sources. In one example, pigment blends or dispersions from various manufacturers can be used.

Typically, the pigments of the present disclosure can be from about 5 nm to about 10 μm in size, and in one aspect, the pigments can be from 10 nm to about 500 nm in size, although sizes outside this range can be used if the pigment can remain dispersed and provide adequate printing properties.

In further detail regarding the pigments, with inks generally, colorants used to improve color gamut on the hue-saturation plane are often dyes rather than pigments. However, dye based inks can have poor durability (e.g. water fastness, light fastness, and air/ozone fastness). Inkjet ink formulations prepared in accordance with the present disclosure, even without the presence of dyes, can have acceptable color gamut, while at the same time providing acceptable decap performance and improved durability compared to dye-based inks.

It is noted that, as used in this disclosure, the singular forms "a," "an," and "the" include plural referents unless the context clearly dictates otherwise. Thus, for example, reference to "an inkjet ink" includes one or more of such inks, and reference to "the pigment" includes reference to one or more amounts of pigments.

As used herein, "liquid vehicle" or "ink vehicle" refers to the liquid fluid in which colorant is dispersed or dissolved to form an ink. Liquid vehicles are well known in the art, and a wide variety of ink vehicles may be used in accordance with embodiments of the present disclosure. Such liquid vehicles may include a mixture of a variety of different agents, including without limitation, surfactants, organic co-solvents, buffers, biocides, viscosity modifiers, sequestering agents, stabilizing agents, and/or water. The liquid vehicle can also carry other additives such as latex particulates, binders, or other polymers, in some embodiments. It is noted that though the liquid vehicles of the present disclosure can include many of these ingredients, the present technology relates more specifically to the use of certain specific organic co-solvents and/or surfactants as set forth herein.

As used herein, "ink" or "inkjet ink" refers to a single liquid vehicle that contains at least one pigment, and in accordance with embodiments of the present disclosure, the inks can also include certain more specific classes of solvents and/or surfactants. In one example, the inkjet ink can be a thermal inkjet ink.

As used herein, "pigment" refers to a colorant particle which is typically substantially insoluble in the liquid vehicle in which it is used. Pigments can be conventionally dispersed using a separate dispersing agent, or can be self-dispersed, having a dispersing agent attached to the surface of the pigment.

As used herein, "self-dispersed" generally refers to pigments that have been functionalized with a dispersing agent, such as by chemical attachment of the dispersing agent to the surface of the pigment. The dispersing agent can be a small molecule or a polymer or an oligomer. The dispersing agent can be attached to such pigments to terminate an outer surface of the pigment with a charge, thereby creating a repulsive nature that reduces agglomeration of pigment particles within the liquid vehicle.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLES

The following examples illustrate the embodiments of the disclosure that are presently best known. However, it is to be understood that the following are only exemplary or illustrative of the application of the principles of the present technology. Numerous modifications and alternative compositions and methods may be devised by those skilled in the art without departing from the spirit and scope of the present disclosure. The appended claims are intended to cover such modifications and arrangements.

Example 1—Formulations

Multiple inkjet ink formulations were prepared in accordance with the following general formulation shown in Table 2, with the specific "Second Surfactant" as set forth in Table 3. Thus, 23 formulations were prepared (i.e. Formulation A through Formulation W), as follows:

TABLE 2

| INGREDIENT | TYPE | WT % |
|---|---|---|
| 2-Pyrrolidinone | Co-Solvent | 7.5 |
| Triethylene Glycol | Co-Solvent | 10 |
| Dantocol | Co-Solvent | 4 |

TABLE 2-continued

| INGREDIENT | TYPE | WT % |
|---|---|---|
| Surfynol 104 (Acetylenic Diol Non-Ionic Surfactant) | Surfactant | 0.3 |
| Second Surfactant (Polysorbate, or Polyoxyethylene Glycol Ether, or Perfluoropolyether) | Surfactant | 0.1 to 1** |
| Proxel GXL (1,2-Benzisothiazolin-3-one) | Biocide | 0.1 |
| Kordek MLX (Methylisothiazolone) | Biocide | 0.14 |
| Hydran ™ RW 7500 | Binder | 1 |
| Pigment Red 282 | Pigment Dispersion | 3.1 solids |
| Pigment Red 15 | Pigment Dispersion | 1.3 solids |

**Surfactant concentration for the Second Surfactant was based on the equimolar concentration using Brij ® S10 is at 0.3 wt % as a benchmark.

TABLE 3

| ID | SURFACTANT | CLASS | PROPERTIES |
|---|---|---|---|
| A | Fluorolink ® D | Perfluoropolyether | Primary alcohol |
| B | Fluorolink ® E | Perfluoropolyether | PEG-primary alcohol |
| C | Fluorolink ® C10 | Perfluoropolyether | Acid |
| D | Flouorolink T | Perfluoropolyether | Diol (opened epoxy) |
| E | Brij ® S10 (control) | PEG ether | Stearyl (C18); EO 10; HLB 12 |
| F | Brij ® 93 (veg) | PEG ether | Oleyl (C18); EO 10; HLB 4 |
| G | Brij ® 98 (veg) or (Brij ® O20) | PEG ether | Oleyl (C18); EO 20; HLB 15 |
| H | Brij ® 30 | PEG ether | Lauryl (C12); EO 4; HLB 9 |
| I | Brij ® C10 | PEG ether | Cetyl (C16); EO 10; HLB 12 |
| J | Brij ® C2 | PEG ether | Cetyl (C16); EO 2; HLB 5 |
| K | Brij ® C20 | PEG ether | Cetyl (C16); EO 20; HLB 15 |
| L | Brij ® CS20 | PEG ether | Cetyl (C16); Steryl (C18); EO 20; HLB 16 |
| M | Brij ® L23 | PEG ether | Lauryl (C12); EO 23; HLB 17 |
| N | Brij ® O10 | PEG ether | Oleyl (C18); EO10; HLB 12 |
| O | Brij ® S100 | PEG ether | Stearyl (C18); EO 100; HLB 18 |
| P | Brij ® S20 | PEG ether | Stearyl (C18); EO 20; HLB 15 |
| Q | Brij ® S721 | PEG ether | Stearyl (C18); EO21; HLB 16 |
| R | Synperonic ® 13/12 | PEG ether | Tridecanol (C13); EO 12; HLB 15 |
| S | Tween ® 20 | Polysorbate | Lauryl (C12); HLB 16.7; 1228 Mw |
| T | Tween ® 60 | Polysorbate | Stearyl (C18); HLB 14.9; 1309 Mw |
| U | Tween ® 80 | Polysorbate | Oleyl (C18); HLB 15; 1310 Mw |
| V | Tween ® 81 | Polysorbate | Oleyl (C18); HLB 10; Oleic Acid 70 wt % |
| W | Tween ® 85 | Polysorbate | Oleyl (C18); HLB 11; Oleic Acid 70 wt % |

Example 2—Ink Evaluation of Decap, Gamut, and Durability

Each of the 23 inks prepared were evaluated for decap performance (short term and sustained decap), gamut, and durability. For each of these tests, an HP Inkjet Printer known commercially available OfficeJet Pro 8000 was used, and the ink lines, boxes, or other markings were printed on HP Multipurpose media.

Decap can be evaluated two different ways. Short Term Decap (ST) performance is verified by first warming up the printer bar, and then, after a printing delay for some (decap) time, several lines were printed and the line quality is judged by image analysis for line darkness, width, and offset relative to a reference (top half of the printhead). More specifically, approximately 50 lines were printed. Typically, line recovery occurs immediately or in the first few lines, but this varies from ink to ink. That being stated, Sustained Decap (SOP) is a more difficult problem to solve. In evaluating SOP, the printing bar is warmed up along the entire printhead width and a reference line was printed. With SOP evaluation of the present example, a variable printing delay was followed by printing 15 or more additional lines. The exact delay and number of lines printed being dependent on the expected printer use. Though SOP values are not present in Table 4, these values are often acceptable when the corresponding ST decap is acceptable, though this is not always the case for every ink.

Gamut was determined by printing varying blocks of colors on print media and then assessing the values with a Gretag-Macbeth spectrophotometer. Performance was judged based on saturation at a fixed ink limit (ng/300$^{th}$).

Durability was determined by printing an area fill plot on one side, followed by pulling the media back into the printer with a duplexer used for two sided printing. Star wheels can damage the print, and thus, each printed image was analyzed to quantify the amount of damage caused by the star wheels.

Data for three tests is provided herein (Short Term Decap, Gamut, and Durability), and a grade scale ranging from 1 to 5 (with 1 being poor performance and 5 being excellent performance) was used, and the results are shown in Table 4 below:

TABLE 4

| ID | DECAP (ST) | GAMUT | DURABILITY |
|---|---|---|---|
| A | 2 | 4 | 3 |
| B | 3 | 5 | 1 |
| C | 1 | 2 | 1 |
| D | 3 | 3 | 5 |
| E | 3 | 3 | 3 |
| F | 4 | 3 | 2 |
| G | 2 | 4 | 4 |
| H | 5 | 3 | 3 |
| I | 3 | 4 | 1 |
| J | 4 | 5 | 5 |
| K | 1 | 4 | 3 |
| L | 1 | 5 | 3 |
| M | 1 | 4 | 4 |
| N | 4 | 5 | 2 |
| O | 1 | 2 | 1 |
| P | 2 | 4 | 2 |
| Q | 1 | 4 | 1 |
| R | 3 | 5 | 1 |
| S | 4 | 2 | 2 |
| T | 2 | 4 | 3 |
| U | 1 | 4 | 3 |
| V | 3 | 5 | 5 |
| W | 4 | 5 | 2 |

While the present technology has been described with reference to certain examples, those skilled in the art will appreciate that various modifications, changes, omissions, and substitutions can be made without departing from the spirit of the disclosure. It is therefore intended that the disclosure be limited only by the scope of the appended claims.

What is claimed is:

1. A pigment-based inkjet ink, comprising:
water;
from 2 wt % to 9 wt % pigment solids;
from 0.05 wt % to 2 wt % of an acetylenic diol non-ionic surfactant;
from 0.05 wt % to 2 wt % of a second surfactant, said second surfactant being:
a polysorbate having an HLB value of less than 15, or
a $C_{12}$-$C_{18}$ polyoxyethylene glycol ether having an ethylene oxide number less than 20, or
a perfluoropolyether including a polyethylene glycol primary alcohol or diol; and
from 5 wt % to 50 wt % of an organic solvent system comprising triethylene glycol and a cyclic amide.

2. The pigment-based inkjet ink of claim 1, wherein the acetylenic diol non-ionic surfactant is a 2,4,7,9-tetramethyl-5-decyne-4,7-diol surfactant or derivative thereof.

3. The pigment-based inkjet ink of claim 1, wherein the second surfactant is the polysorbate.

4. The pigment-based inkjet ink of claim 3, wherein the polysorbate includes at least 50 wt % lipophilic oleic acid.

5. The pigment-based inkjet ink of claim 1, wherein the second surfactant is the $C_{12}$-$C_{18}$ polyoxyethylene glycol ether.

6. The pigment-based inkjet ink of claim 5, wherein the $C_{12}$-$C_{18}$ polyoxyethylene glycol ether is oleyl with a single cis unsaturated group.

7. The pigment-based inkjet ink of claim 1, wherein the second surfactant is the perfluoropolyether.

8. The pigment-based inkjet ink of claim 1, wherein the cyclic amide comprises a cyclic diamide.

9. The pigment-based inkjet ink of claim 1, wherein the cyclic amide comprises 2-pyrrolidinone and di-(2-hydroxyethyl)-5,5-dimethylhydantoin.

10. The pigment-based inkjet ink of claim 1, wherein the pigment solids comprise two different pigments collectively in the range of 2 wt % to 9 wt %.

11. The pigment-based inkjet ink of claim 1, wherein the inkjet ink is devoid of dye.

12. The pigment-based inkjet ink of claim 1, further comprising from 0.1 wt % to 3 wt % polymeric binder.

13. A method of inkjet printing, comprising jetting an inkjet ink onto a media substrate, said inkjet ink comprising water; from 2 wt % to 9 wt % pigment solids; from 0.05 wt % to 2 wt % of an acetylenic diol non-ionic surfactant; from 0.05 wt % to 2 wt % of a second surfactant selected from a polysorbate having an HLB value of less than 15, a $C_{12}$-$C_{18}$ polyoxyethylene glycol ether having an EO value less than 20, or a perfluoropolyether including a polyethylene glycol primary alcohol or diol; and from 5 wt % to 50 wt % of an organic solvent system comprising triethylene glycol and a cyclic amide.

14. The method of claim 13, wherein the step of jetting is from a page wide, laterally stationary, printhead assembly bar at a speed ranging from 2 inches per second to 60 inches per second.

15. A method of making a pigment-based inkjet ink, comprising:
preparing a liquid vehicle including water, organic solvent, surfactant, and a polymeric binder; and
slowly adding pigment particles to disperse and suspend the pigment particles within the liquid vehicle,
wherein the pigment-based inkjet ink after preparation comprises water; from 2 wt % to 9 wt % pigment solids; from 0.05 wt % to 2 wt % of an acetylenic diol non-ionic surfactant; from 0.05 wt % to 2 wt % of a second surfactant, said second surfactant being a polysorbate having an HLB value of less than 15, or a $C_{12}$-$C_{18}$ polyoxyethylene glycol ether having an ethylene oxide number less than 20, or a perfluoropolyether including a polyethylene glycol primary alcohol or diol; from 5 wt % to 50 wt % of an organic solvent system comprising triethylene glycol and a cyclic amide; and 0.1 wt % to 3 wt % polymeric binder.

* * * * *